United States Patent
Gambuzza

[11] Patent Number: 5,946,394
[45] Date of Patent: Aug. 31, 1999

[54] ISOLATION AMPLIFIER WITH HOOK SWITCH CONTROL

[75] Inventor: Michael J. Gambuzza, Boston, Mass.

[73] Assignee: C. P. Clare Corporation, Beverly, Mass.

[21] Appl. No.: 08/873,674

[22] Filed: Jun. 12, 1997

[51] Int. Cl.[6] .......................... H04M 1/00; H04M 11/00
[52] U.S. Cl. ........................ 379/399; 379/56.1; 379/379
[58] Field of Search .................... 379/395, 399, 379/93.36, 93.28, 402, 412, 406, 56.1, 379; 375/297, 296, 295; 330/10

[56] References Cited

U.S. PATENT DOCUMENTS

| | | | |
|---|---|---|---|
| H118 | 9/1986 | Biggs et al. ........................... | 179/84 T |
| 3,772,514 | 11/1973 | Sunderland ............................. | 250/551 |
| 4,137,428 | 1/1979 | Federico et al. ...................... | 179/1 SW |
| 4,282,604 | 8/1981 | Jefferson ................................. | 359/153 |
| 4,310,725 | 1/1982 | Mehaffey ........................... | 179/18 AH |
| 4,317,964 | 3/1982 | Biggs et al. ........................... | 179/81 R |
| 4,321,429 | 3/1982 | Takatsuki et al. .................... | 179/2 DP |
| 4,558,183 | 12/1985 | Corris et al. ........................... | 379/56.1 |
| 4,591,662 | 5/1986 | Legros et al. ......................... | 179/2 DP |
| 4,591,663 | 5/1986 | Sullivan ................................... | 359/180 |
| 4,723,267 | 2/1988 | Jones et al. ................................ | 379/93 |
| 4,727,535 | 2/1988 | Brandt .................................... | 359/113 |
| 4,742,538 | 5/1988 | Szlam .................................... | 379/361 |
| 4,860,345 | 8/1989 | Mellon .................................. | 379/123 |
| 5,113,434 | 5/1992 | Fox ......................................... | 379/413 |
| 5,245,654 | 9/1993 | Wilkison ................................ | 379/405 |
| 5,280,526 | 1/1994 | Laturell ................................. | 379/405 |
| 5,291,545 | 3/1994 | Stahl ........................................ | 379/98 |
| 5,369,687 | 11/1994 | Farkas .................................. | 379/93.36 |
| 5,438,210 | 8/1995 | Worley ...................................... | 257/82 |
| 5,514,875 | 5/1996 | Krause .................................... | 250/551 |
| 5,555,293 | 9/1996 | Krause ................................. | 379/93.36 |
| 5,600,715 | 2/1997 | Bingel .................................... | 379/393 |
| 5,692,041 | 11/1997 | Torazzina ............................... | 379/379 |
| 5,734,703 | 3/1998 | Hiyoshi ............................... | 379/93.28 |
| 5,751,803 | 5/1998 | Shpater .................................. | 379/379 |
| 5,774,541 | 6/1998 | Krause .................................... | 379/405 |

FOREIGN PATENT DOCUMENTS

WO96/05686  2/1996  WIPO .......................... H04M 11/00

OTHER PUBLICATIONS

Bob Krause, "Designing Linear Amplifiers Using the IL300 Optocoupler Appnote 50", Siemens Application Note, 1995, pp. 11–163 —11–179.

Primary Examiner—Nguyen Vo
Assistant Examiner—Charles N. Appiah
Attorney, Agent, or Firm—Lappin & Kusmer

[57] ABSTRACT

An isolation amplifier circuit with hook switch control includes first and second amplifier stages optically isolated from and coupled to each other. A biasing circuit is optically coupled to the amplifier to provide a switchable prebias to the amplifier to allow the amplifier to process bipolar voltage input signals. A hook switch circuit is coupled to the biasing circuit such that as the bias condition is switched, the hook switch is opened or closed. The same optical coupling circuitry can be used to couple the first and second amplifier stages and to couple the biasing circuit to the hook switch circuit such that savings in circuit space and cost are realized.

25 Claims, 4 Drawing Sheets

ISOLATION AMPLIFIER WITH HOOK SWITCH CONTROL

BACKGROUND OF THE INVENTION

Telephone interface devices such as modems and the like are typically used to couple a telephone line to a user device such as a computer. In general, these devices typically include a device interface for connection to the computer and a telephone line interface for connection to the telephone line. The telephone line interface typically includes a circuit of the type commonly referred to as a data access arrangement (DAA), which transmits and receives various telephone line signals and otherwise provides the standard required telephone line interface.

The circuitry in the interface device can include an isolation amplifier circuit which receives signals from the computer and couples them to the telephone line while providing the required isolation between the user device and the telephone line. The amplifier circuit can include first and second amplification stages optically isolated from and coupled to each other. In typical fashion, the first stage of the amplifier drives an optically emitting element such as a light-emitting diode (LED) which is optically coupled to a photosensitive element such as a photodiode in the second amplifier stage. A reflective dome is typically located over the LED and the photodiode to provide the optical coupling.

Typically, the signal coupled from the user device to the first amplifier stage is a bipolar signal, that is, its level swings between positive and negative voltages. To enable the isolation amplifier to accommodate the bipolar signal without clipping it, the interface device typically includes a prebiasing circuit which continuously applies a DC prebias voltage to the amplifier to raise the DC level of the amplifier such that the bipolar input signals can be processed.

Interface devices can also include switching circuitry, commonly referred to as a "hook switch", which closes a connection to the telephone line in an "off-hook" condition such that current is permitted to flow between the public switched telephone network (PSTN) and the user device. In the "on-hook" condition, the hook switch is open to prevent current flow to the PSTN. A conventional hook switch circuit includes a relay controlled by the user device via a control signal which when activated closes the relay to make the connection with the telephone line and which when deactivated opens the relay.

In some prior systems, the hook switch control signal is optically isolated from the hook switch itself. The control signal activates an optical emitting device such as an LED which is optically coupled to a photosensitive device such as a phototransistor or photodiode. When the hook switch signal is activated, the photodiode is switched to an off-hook state to close the hook switch and thereby connect to the telephone line.

U.S. Pat. No. 5,555,293 to Krause describes an exemplary DAA telephone interface device illustrative of a typical prior art interface configuration. The DAA described in the '293 patent includes an isolation amplifier having optically coupled stages used to transfer signals between the telephone line and subscriber equipment. The device also includes a separate hook switch circuit driven by an off-hook control line. The off-hook control is optically coupled to the hook switch circuit which includes a pair of FET devices. The '293 patent is therefore illustrative of prior art systems which utilize individual and independent circuitry to provide line signal isolation/amplification and hook switch control.

Hence, prior art telephone interface devices, e.g., DAAs, can include a large amount of circuitry to implement and control the interface between the user device, e.g., modem, computer, and the telephone network. Such hardware-intensive systems can be quite expensive; therefore, reduction in the number of electronic components in such systems can be important in reducing overall size and cost.

SUMMARY OF THE INVENTION

The present invention is directed to a interface circuit and method for providing an interface between a telephone line and a user telephone device such as a modem and/or a host computer. The circuit of the invention includes an isolation amplifier circuit which is coupled between the user telephone device and the telephone line and couples signals between the telephone device and the telephone line. A biasing means is coupled to the amplifier circuit to bias or "prebias" the amplifier circuit such that it can process bipolar variations in signals. The biasing means is switchable such that it can be switched between a biased state in which a prebias is applied to the amplifier circuit and an unbiased state in which the prebias is not applied to the amplifier circuit. The interface circuit also includes a hook switch circuit which controls connection of the telephone device to the telephone line. The hook switch is switchable between a connected state in which current can flow between the telephone device and the telephone line and an unconnected state in which current flow is interrupted. The interface circuit also includes means for coupling the biasing means to the hook switch circuit such that as the biasing means is switched between the biased state and the unbiased state, the hook switch switches between the connected state and the unconnected state. Hence, the invention provides a telephone interface circuit in which control of the hook switch also controls application of a prebias to the amplifier and/or control of the amplifier prebias also controls the hook switch.

In one embodiment, the isolation amplifier circuit includes a first amplifier stage and a second amplifier stage optically coupled to each other to provide the required DC isolation between the telephone line and the user telephone device. The optical coupling device includes an optical emitting device, such as an LED, under a reflective element such as a reflective dome. As current flows through the LED, optical radiation is coupled by the reflective dome to a first photosensitive device, such as a phototransistor or photodiode, which is coupled to the first amplifier stage and a second photosensitive device coupled to the second amplifier stage. The current flow through the LED also applies the DC prebias to the amplifier to accommodate the bipolar nature of the signal being coupled to the telephone line. The current flowing through the LED is controlled by a control signal applied to a switch such as a transistor such that application of the prebias and coupling of the first and second amplifier stages can be externally controlled.

In one embodiment, the hook switch circuit includes an optically sensitive device such as a photodiode or phototransistor located in proximity to the same optically reflective element used to couple the first and second amplifier stages. When the prebias signal is activated to apply the prebias to the amplifier, optical radiation is also coupled from the LED to the photosensitive device of the hook switch circuit. The hook switch closes such that current flows in the telephone line. Hence, the control signal used to operate the prebias switch also operates the hook switch such that when the hook switch is closed to enter the off-hook state, the prebias is also applied to the amplifier circuit.

The interface circuit of the invention combines activation of the prebias and hook switch functions into a single operation. In one embodiment, this is accomplished by forming multiple optically coupled circuits under the same optically reflective dome. Specifically, in one embodiment, the optically sensitive devices for the first and second amplifier stages and the hook switch circuit and the LED are all formed under the same optically reflective dome.

The telephone interface circuit and method of the invention provide numerous advantages over prior approaches. For example, by combining the amplifier prebias and hook switch functions, the invention reduces circuit space and cost. A single optical isolation/coupling device is used to provide optical isolation/coupling for the amplifier stages as well as the hook switch control circuit. The use of a single optical coupling device where multiple devices were conventionally used saves circuit space and expense, which are extremely important in the competitive telecommunications hardware industry.

Also, the use of a switched prebias substantially reduces the overall power consumption of the interface circuit. The prebias is only applied and, therefore, consuming power when the interface is off-hook and in use. In prior systems, the prebias was applied continuously, resulting in constant wasted power.

BRIEF DESCRIPTION OF THE DRAWINGS

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE PREFERRED EMBODIMENTS

Figure 1:
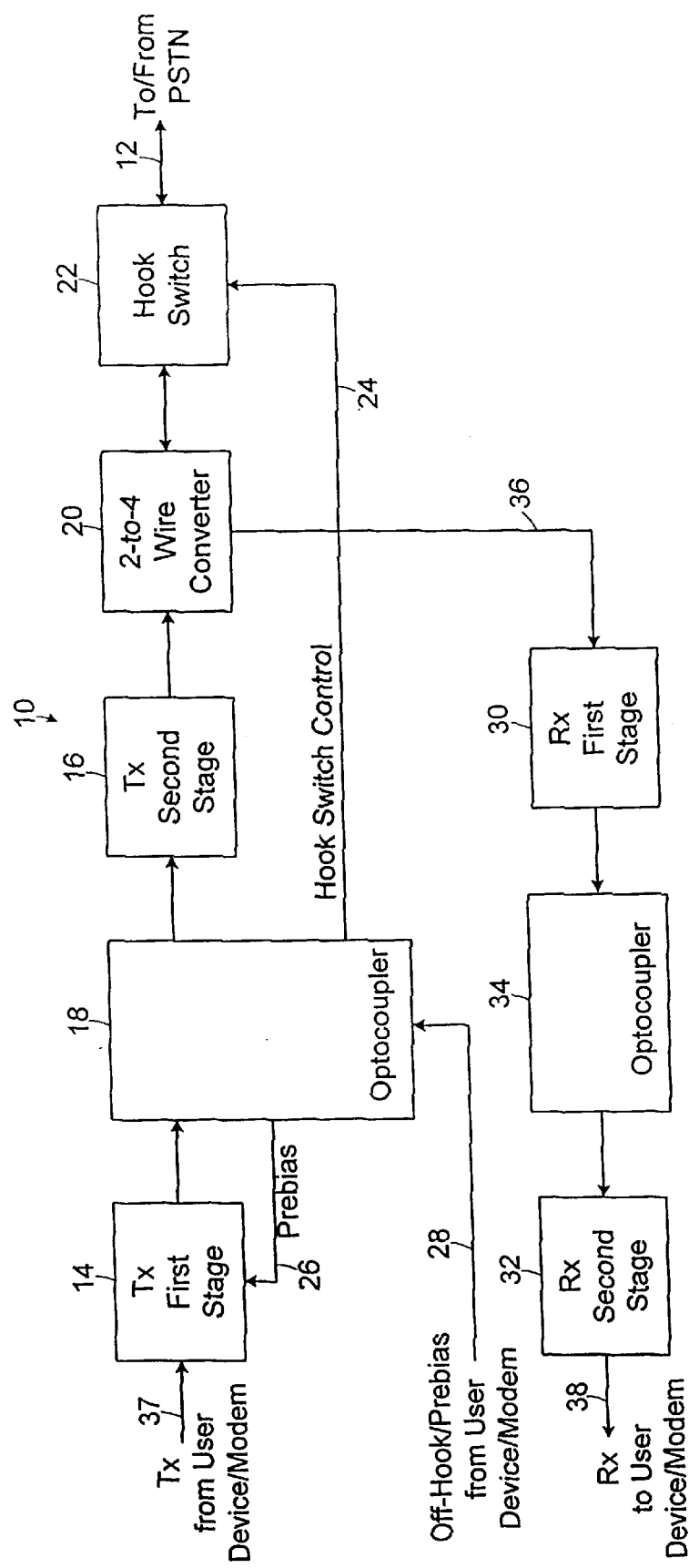
FIG. 1 is a schematic block diagram of one embodiment of the interface circuit of the invention.

FIG. 1 is a schematic block diagram which illustrates one embodiment of the interface circuitry 10 of the invention. The circuitry 10 can perform functions of a DAA and therefore provide an interface between a user device such as a computer and/or modem and the public switched telephone network (PSTN), which is connected to the interface circuitry 10 by a telephone line 12. The circuitry 10 provides for a transmit (Tx) mode in which signals are transferred from the user device to the telephone line 12 and a receive (Rx) mode in which signals are transferred from the telephone line 12 to the user device.

The transmit isolation amplifier includes a first amplifier stage 14 and a second amplifier stage 16 which are optically isolated from and coupled to each other by an optical coupling circuit or optocoupler 18. A transmit signal from the user device is received at the first amplifier stage 14 on Tx line 37 and is amplified or otherwise processed by the first amplifier stage 14 and coupled by optocoupler 18 to the second amplifier stage 16. The amplified transmit signal from the second stage 16 is coupled to a hybrid interface circuit 20 which serves as a 2-to-4 wire converter and then through a hook switch 22 which, when closed by the hook switch control line 24, passes the transmit signal to telephone line 12.

The 2-to-4 wire converter 20 allows the circuitry 10 and user device to operate in a transmit/receive configuration using the standard 2-wire tip and ring telephone line 12. Each of the transmit and receive modes utilizes two wires and the 2-to-4 wire converter switches the two standard tip and ring telephone lines between transmit and receive circuitry depending on the operational mode of the interface.

The amplifier prebias is applied to the amplifier via the optocoupler 18 through line 26. When the Off-Hook/Prebias control signal on control line 28 is activated, the prebias is applied to the amplifier. In addition, activation of the Off-Hook/Prebias signal commands the interface circuitry 10 to an off-hook state via the hook switch control line 24. When the hook switch control line 24 is active, the hook switch 22 is closed such that current can flow in the telephone line 12 between the PSTN and the user device. Therefore, a single control line 28 is used to both apply the prebias to the isolation amplifier and control the hook condition of the interface circuitry 10 and, specifically, the hook switch 22. When the control line 28 is deactivated, the prebias is removed from the isolation amplifier circuit and the hook switch 22 is opened such that current is not permitted to flow to and from the telephone line 12.

The receive portion of the circuitry is similar to the transmit portion except for the prebias and hook switch control. The receive isolation amplifier includes a first amplifier stage 30 coupled to a second amplifier stage 32 by an optical coupling circuit or optocoupler 34. Signals from the PSTN are routed from the telephone line 12, through the hook switch 22 and 2-to-4 wire converter 20 along line 36 to the receive circuitry. The amplified received signal is transferred to the user device via line 38.

Figure 2:
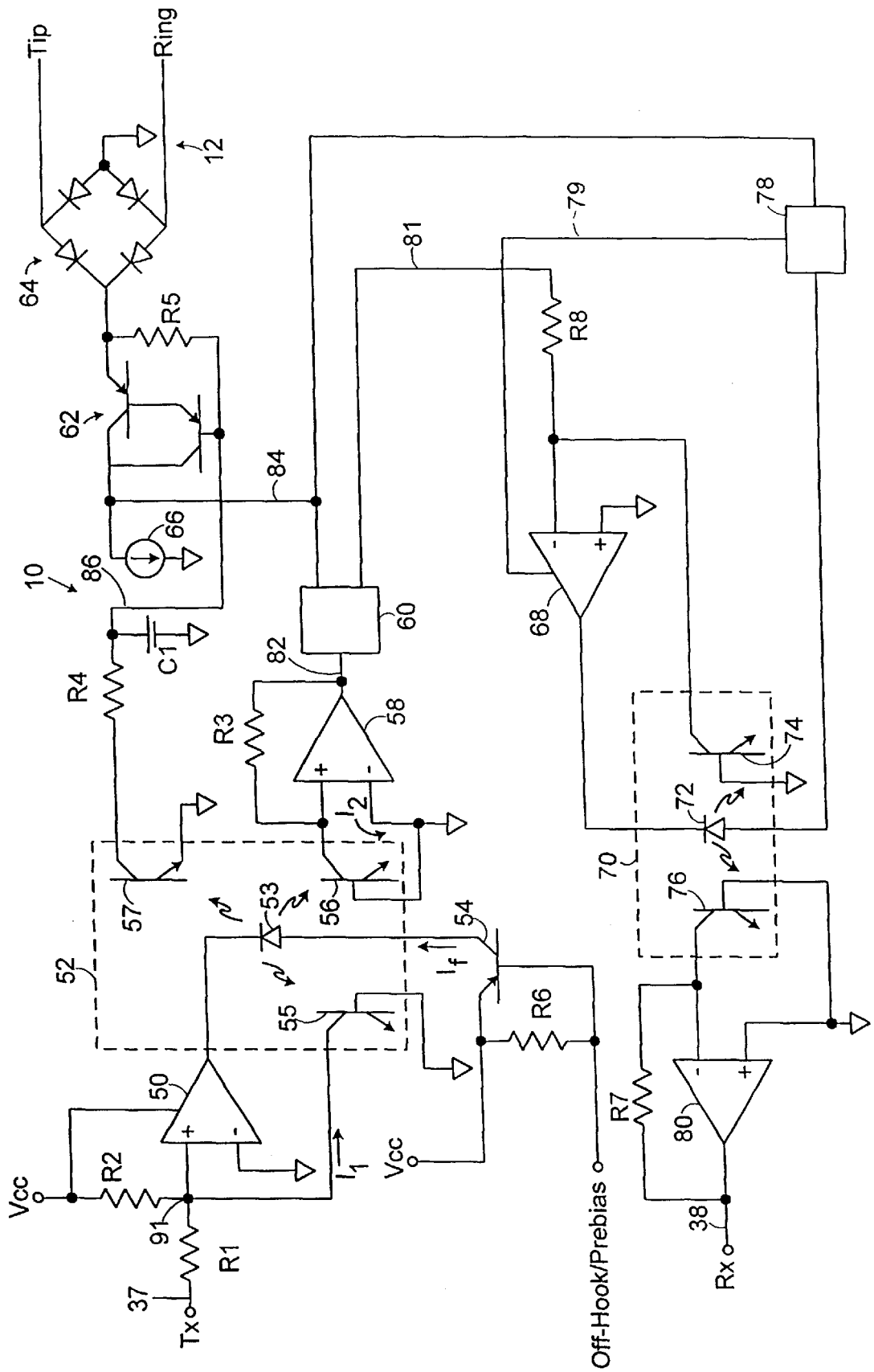
FIG. 2 is a detailed schematic circuit diagram of the interface circuit of FIG. 1.

FIG. 2 is a more detailed schematic diagram of one embodiment of the interface circuitry 10 of the present invention. The isolation amplifier circuit of the invention can include resistors R1, R2, and R3, amplifiers 50 and 58 and the optical coupling circuitry 52, which can include an LED 53 and photosensitive transistors or photodiodes 55 and 56. The isolation amplifier is a unipolar photovoltaic amplifier. The input signal applied at the Tx terminal at line 37 is, in general, a bipolar sinusoidal waveform which crosses above and below ground. Because the amplifier is powered by a single-ended power supply $V_{cc}$, a prebias is applied to the amplifier to prevent clipping of the signal at ground. The output voltage V of the composite amplifier circuit on line 82, is given by:

$$V = (K3)(R3)\left[\frac{V_{CC}}{R2} + \frac{V_0 \sin\omega t}{R1}\right]; \quad (1)$$

where $V_0$ is the peak voltage applied to the input of the amplifier 50, and $$K3 = \frac{K2}{K1};$$

where K1 is the current transfer ratio of the LED 53 current to the photogenerated current developed by photodiode 55; and K2 is the current transfer ratio of the LED 53 current to the photogenerated current developed by photodiode 56.

Since the input signal $V_0$ traverses above and below ground, and since a unipolar power supply $V_{cc}$ is used, the prebias is applied to the amplifier such that the amplifier output V at line 82 is set to a DC quiescent output voltage $V_Q$ at a level above ground and below $V_{cc}$ such that the input signal on line 37 is not clipped by the single-ended amplifier 50. $V_Q$ can typically be set to $V_{cc}/2$.

To illustrate, where no transmit signal is applied at the Tx terminal, that is, where $V_0=0$, and assuming that the overall transfer gain K3=1; then Equation 1 reduces to:

$$V = V_{CC}\left[\frac{R3}{R2}\right]. \qquad (2)$$

So, for example, if $V_{cc}$=5 volts and $V_Q$=2.5 volts, then the ratio R3/R2=½. Choosing resistors R3 and R2 in accordance with the required ½ ratio will result in a quiescent output voltage $V_Q$ at the desired level of $_{2.5}$ volts.

The quiescent output voltage $V_Q$ is created by the current injected into the node 91 at the non-inverting node of amplifier 50, which causes an LED current $I_f$ to flow resulting in the LED 53 providing an output light to photodiode 55, 56 and 57 allowing each to operate in a low impedance state. A resulting photocurrent $I_1$ of magnitude equal to that of $I_f$ flows out of the node 91 through photodiode 51 such that the node 91 remains at virtual ground. Mathematically, $I_1=(I_f)(K1)$. The LED 53 output light also impinges on photodiode 56 to cause a current I2 to flow at the non-inverting node of the linear transconductance amplifier 58. This results in an output voltage $V=(I_2)(R3)$ at 82.

Hence, when the Off-Hook/Prebias signal is active (low), transistor 54 conducts current $I_f$ such that LED 53 emits light. The light is reflected by a reflective dome at the optocoupler 52 to photodiodes 55 and 56 such that the amplifier stages 50 and 58 are coupled across optocoupler 52 to provide the output voltage V at line 82. With no signal applied at the Tx input, the prebias is applied such that only the DC quiescent voltage $V_Q$ appears at line 82. However, when a transmit signal is applied, the output voltage V at line 82 is modulated as defined by Equation 1.

The output signal at 82 is coupled to circuitry 60 which serves the function of a 2-to-4 wire converter, which allows the transmit and receive functions of the circuit of the invention to be implemented in four lines connected through the 2-to-4 wire converter 60 to a standard 2-wire PSTN. The transmit signal is coupled via line 84 to a PNP Darlington transistor pair 62 which serves as the hook switch. When the Darlington pair 62 is activated via line 86 into saturation such that it conducts current, the output signal on line 84 is coupled through the diode bridge circuit 64 to the tip and ring lines of the telephone line 12.

As shown in FIG. 2, in one embodiment of the invention, the Darlington pair hook switch 62 is operated via a control line 86, the state of which is controlled by current through phototransistor 57 in the optical coupling circuit 52. The phototransistor 57 is located under the same reflective dome used for LED 53 and photodiodes 55 and 56 such that current through LED 53 is coupled to all three devices, 55, 56 and 57 at the same time. As described above, when the Off-Hook/Prebias signal is activated (low) and current If flows through LED 53, amplifier stages 50 and 58 are coupled together. In addition, phototransistor 57 is also simultaneously actuated such that the Darlington pair 62 conducts current, that is, the hook switch 62 is closed to allow current to flow through the telephone line 12. The circuit 66 is a gyrator circuit or electronic inductor which has a low DC resistance and high AC impedance to draw current from the telephone line.

The receive circuitry of the interface device 10 includes resistors R7 and R8, amplifier 68 and linear transconductance amplifier 80, power supply circuit 78 and optical coupling circuitry 70 which includes an LED 72 and photodiodes 74 and 76 and an optically reflective dome. Input signals received on the tip and ring lines of the telephone line 12 are connected across the diode bridge 64 through the Darlington pair hook switch 62 to the 2-to-4 wire converter 60 via line 84. The circuitry 60 routes the incoming signal to the receive circuitry. The first stage of amplification provided by amplifier 68 drives the LED 72 which is powered through power supply circuitry 78. The circuitry 78 provides regulated power to the receive circuitry using the raw power from the telephone line 12. The modulated input signal is provided to the receive circuitry on line 81. The signal modulates the output of LED 72 via amplifier 68 and resistor R8. The input signal is coupled through the optical coupler 70 via the reflective dome to the photodiode 76 which transmits the signal to amplifier 80. The processed receive signal is coupled via line 38 to the user device or modem for processing.

Figure 3:
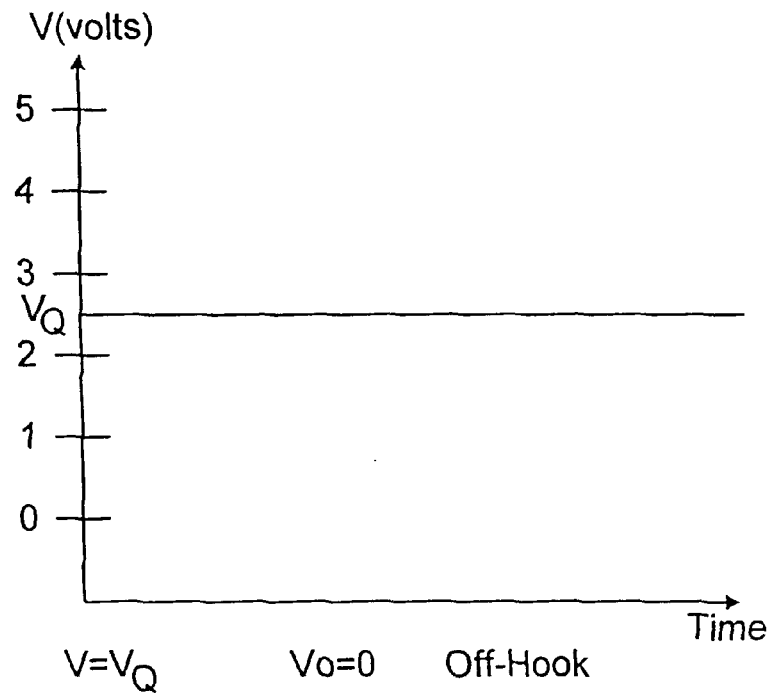
FIG. 3 is a schematic plot of amplifier output voltage versus time in the off-hook state with no transmit signal applied.
Figure 5:
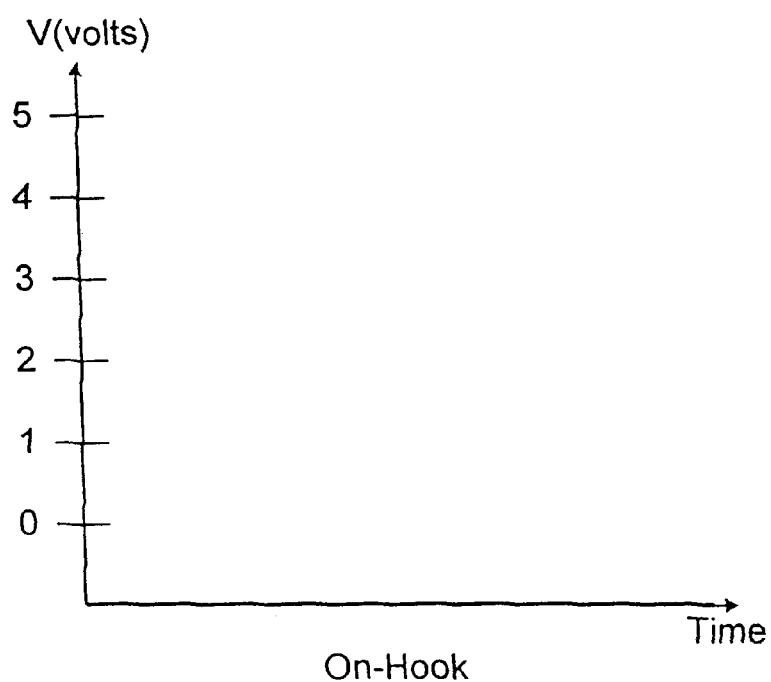
FIG. 5 is a schematic plot of amplifier output voltage versus time for the on-hook state.

FIGS. 3–5 contain voltage-versus-time plots which illustrate the various operating conditions of the interface circuit 10 of the invention. The plots assume that $V_{cc}$=5 volts and that K3=1.

FIG. 3 is a plot of the voltage V at line 82 in the state in which no input transmit signal is applied at Tx, that is, where $V_0$=0. It also shows the situation where the interface circuit is in the off-hook condition. In this case, the output voltage V at line 82 is constant over time at $V=V_Q$, the quiescent DC output voltage.

Figure 4A:
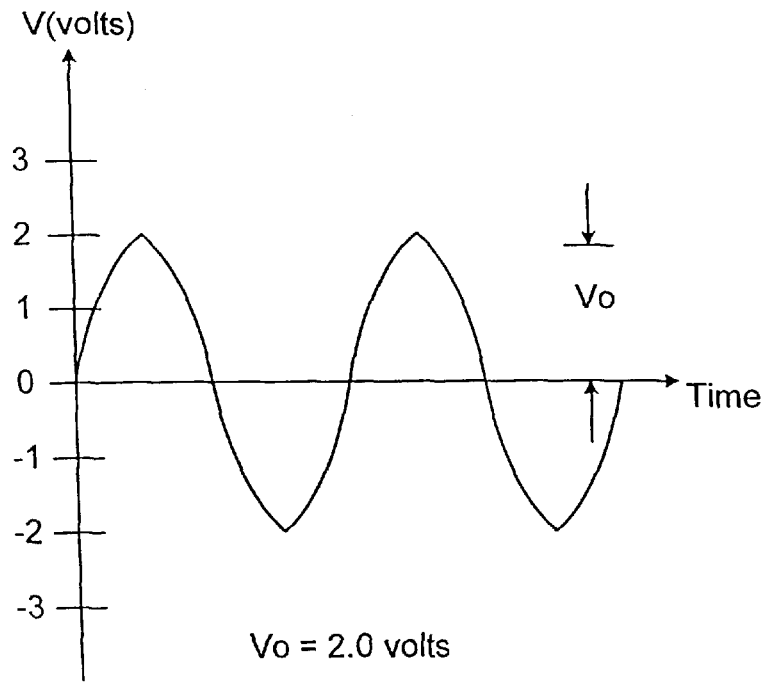
FIG. 4A is a schematic plot of an exemplary bipolar voltage signal as applied to the circuit of the invention.

FIG. 4A is a plot of an exemplary time varying signal applied at the Tx input. In general, the input signal is a bipolar voltage signal having an amplitude of $V_0$. That is, as shown in FIG. 4A, the signal voltage varies over time between positive (above 0 volts) and negative (below 0 volts) values.

Figure 4B:
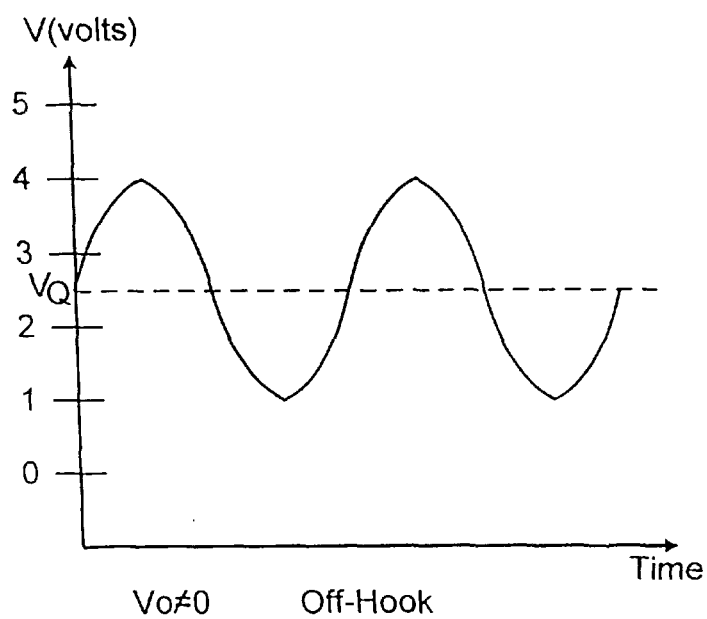
FIG. 4B is a schematic plot of amplifier output voltage versus time in the off-hook state with the transmit signal of FIG. 4A applied to the amplifier.
Figure 2:
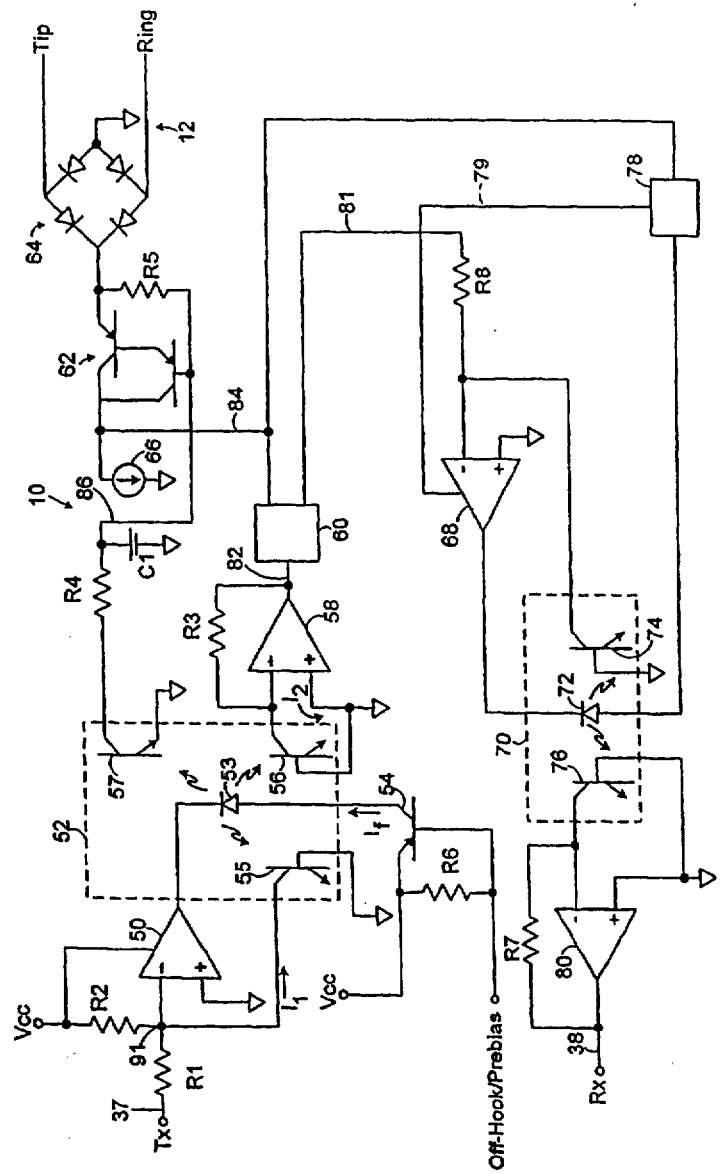
Figure 2:
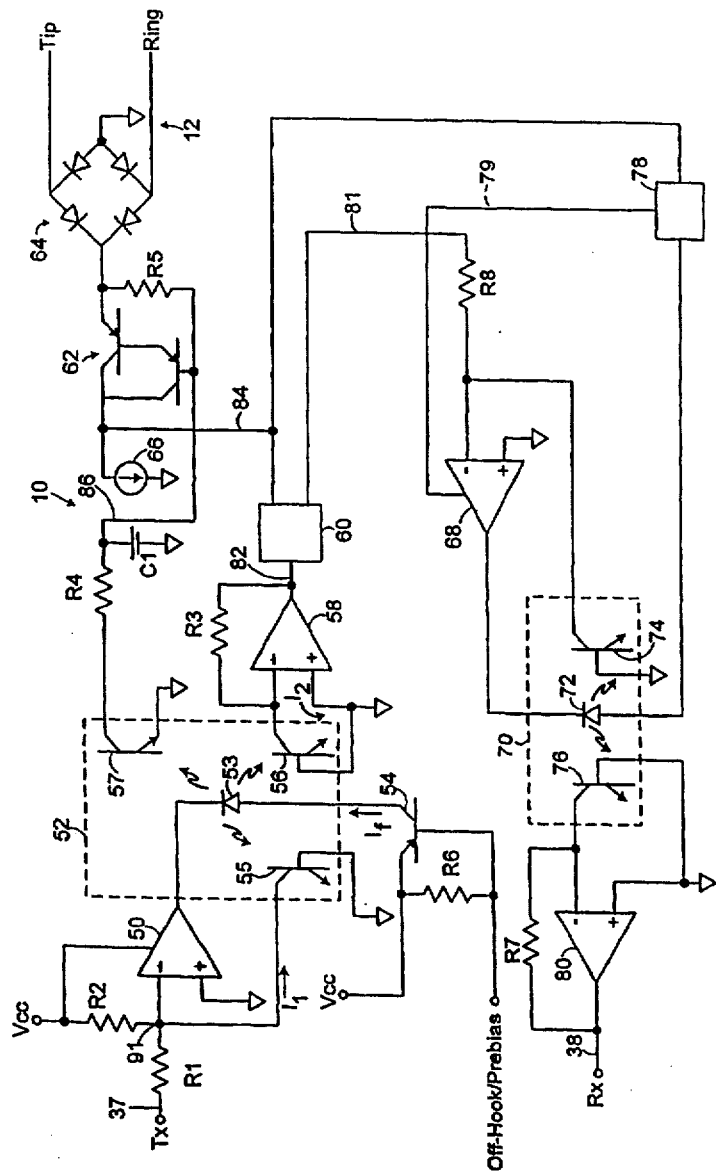

FIG. 4B illustrates the situation in which the interface circuit of the invention is off-hook and the bipolar voltage signal of FIG. 4A having peak amplitude $V_0$ is applied at the Tx input. The voltage V at line 82 is a time-varying voltage signal which varies around a biased DC value of $V_Q$.

FIG. 5 is a plot of the voltage V at line 82 in the state in which the system is on-hook, that is, where the Off-Hook/Prebias signal is in a deactivated (high) state such that no current $I_f$ flows through LED 53. In this condition, the amplifier stages 50 and 58 are isolated from each other and no prebias is applied to the circuit. As a result, the signal V at line 82 is a constant level of 0 volts.

While this invention has been particularly shown and described with references to preferred embodiments thereof, it will be understood by those skilled in the art that various changes in form and details may be made therein without departing from the spirit and scope of the invention as defined in the following claims.

What is claimed is:

1. An isolation interface circuit for controlling the bidirectional communication of transmitted signals between a communication device and a communication channel, comprising:

a hook switch circuit for controlling the connection of the communication device to the communication channel, the hook switch circuit being responsive to a switching signal so as to be switchable between a connected state and an unconnected state; and an optical isolation circuit, coupled between the communication device and the communication channel and between the communication device and the hook switch circuit, for coupling a transmitted signal between the communication device and the communication channel, the isolation circuit including:

(A) a first optical path for transmitting transmitted signals from the communication channel to the communication device;

(B) a second optical path for transmitting transmitted signals from the communication device to the communication channel; and (C) a switching signal generating circuit including a third optical path for generating the switching signal in response to transmitted signals received from either the communication device or communication channel.

2. An circuit according to claim 1, wherein the optical isolation circuit includes:

(A) a first photo-transmissive device, responsive to transmitted signals received from the communication device to be transmitted over the communication channel, for generating an optical signal as a function of the transmitted signals received from the communication device;

(B) a first photo-responsive device, responsive to the optical signal, for generating a first signal as a function of the optical signal, wherein (i) signals transmitted to the communication channel are a function of the first signal and (ii) the optical path between the first photo-transmissive device and the first photo-responsive device define the second optical path; and (C) a second photo-responsive device, responsive to the optical signal, for generating a second signal as a function of the optical signal, wherein the optical path between the first photo-transmissive device and the second photo-responsive device define the third optical path.

3. A circuit according to claim 2, wherein the isolation circuit further includes:

(D) a second photo-transmissive device, responsive to transmitted signals received from the communication channel to be transmitted over the communication device, for generating a second optical signal as a function of the transmitted signals received from the communication channel; and (E) a third photo-responsive device, responsive to the optical signal, for generating second signals as a function of the second optical signal, wherein (i) signals transmitted to the communication device are a function of the second signals and (ii) the optical path between the second photo-transmissive device and the third photo-responsive device defines the third optical path.

4. A circuit according to claim 2, wherein a first linear transconductance amplifier is connected between the first photo-responsive device and the communication channel for linearly amplifying the signals transmitted from the first photo-responsive device to the communication channel.

5. A circuit according to claim 4, wherein the isolation circuit further includes:

(D) a second photo-transmissive device, responsive to transmitted signals received from the communication channel to be transmitted over the communication device, for generating a second optical signal as a function of the transmitted signals received from the communication channel; and (E) a third photo-responsive device, responsive to the optical signal, for generating second signals as a function of the second optical signal, wherein (i) signals transmitted to the communication device are a function of the second signals and (ii) the optical path between the second photo-transmissive device and the third photo-responsive device defines the third optical path; and wherein the isolation circuit further includes a second linear transconductance amplifier connected between the third photo-responsive device and the communication device for linearly amplifying signals transmitted between the third photo-responsive device and the communication device.

6. An isolation circuit according to claim 1, further including a low pass filter for filtering said switching signal so as to remove high frequency components to prevent the hook switch circuit from modulating between its connected and unconnected states.

7. An isolation circuit according to claim 1, further including a gyrator circuit for generating current from the communication channel so as to operate the hook switch circuit in response to the switching signal.

8. An isolation circuit according to claim 1, wherein the hook switch circuit includes a Darlington pair for conducting transmitted signals in response to the switching signal being applied to and activating the pair to a connecting state.

9. An isolation circuit according to claim 1, further comprising a biasing circuit for biasing the hook switch, wherein the optical isolation circuit optically couples the biasing circuit to the hook switch circuit.

10. An isolation circuit according to claim 1, wherein each of said optical paths includes an optically reflective element.

11. An isolation interface circuit for controlling the bidirectional communication of transmitted signals between a communication device and a communication channel, comprising:

a hook switch circuit for controlling the connection of the communication device to the communication channel, the hook switch circuit being responsive to a switching signal so as to be switchable between a connected state and an unconnected state; and an optical isolation circuit, coupled between the communication device and the communication channel and between the communication device and the hook switch circuit, for coupling a transmitted signal between the communication device and the communication channel, the isolation circuit including:

(A) a first optical path for transmitting transmitted signals from the communication channel to the communication device; and (B) a second optical path for transmitting transmitted signals from the communication device to the communication channel;

wherein the second optical path is non-conductive when signals are transmitted from the communication channel to the communication device, and the first optical path is non-conductive when signals are transmitted from the communication device to the communication channel.

12. An optical isolation circuit according to claim 11, further including a switching signal generating circuit for generating the switching signal in response to transmitted signals received from either the communication device or communication channel.

13. An optical isolation circuit according to claim 12, wherein the switching signal generating circuit includes a third optical path for generating the switching signal in response to transmitted signals received from either the communication device or communication channel.

14. An isolation circuit according to claim 11, further including a low pass filter for filtering said switching signal so as to remove high frequency components to prevent the hook switch circuit from modulating between its connected and unconnected states.

15. An isolation circuit according to claim 11, further including a gyrator circuit for generating current from the communication channel so as to operate the hook switch circuit in response to the switching signal.

16. An isolation circuit according to claim 11, wherein the hook switch circuit includes a Darlington pair for conducting transmitted signals in response to the switching signal being applied to and activating the pair to a connecting state.

17. An isolation circuit according to claim 11, further comprising a biasing circuit for biasing the hook switch, wherein the optical isolation circuit optically couples the biasing circuit to the hook switch circuit.

18. An isolation circuit according to claim 11, wherein each of said optical paths includes an optically reflective element.

19. A circuit for controlling an interface between a communication device and a communication channel, comprising:

a first linear isolation photovoltaic amplifier circuit, biased for bipolar operation and including a first optical isolation path, coupled between the communication device and the communication channel for transmitting a signal from the communication device to the communication channel;

an input transmit terminal coupled to the input of the first linear isolation photovoltaic amplifier circuit;

a second linear isolation photovoltaic amplifier circuit, biased for bipolar operation and including a second optical isolation path, coupled between the communication device and the communication channel for transmitting a signal from the communication channel to the communication device;

an output receive terminal coupled to the output of the second linear isolation photovoltaic amplifier circuit; and a hook switch circuit for controlling connection of the communication device to the communication channel, the hook switch circuit being switchable between a connected state and an unconnected state;

wherein the input transmit terminal is optically isolated from the output receive terminal.

20. An optical isolation circuit according to claim 19, wherein the hook switch circuit is responsive to a switching signal, further including a switching signal generating circuit for generating the switching signal in response to transmitted signals received from either the communication device or communication channel.

21. An isolation circuit according to claim 20, further including a low pass filter for filtering said switching signal so as to remove high frequency components to prevent the hook switch circuit from modulating between its connected and unconnected states.

22. An isolation circuit according to claim 20, further including a gyrator circuit for generating current from the communication channel so as to operate the hook switch circuit in response to the switching signal.

23. An isolation circuit according to claim 19, wherein the hook switch circuit includes a Darlington pair for conducting transmitted signals in response to the switching signal being applied to and activating the pair to a connecting state.

24. An isolation circuit according to claim 11, further comprising a biasing circuit for biasing the hook switch.

25. A method of controlling the bidirectional communication of transmitted signals between a communication device and a communication channel, comprising:

controlling in response to a switching signal the connection of the communication device to the communication channel, and (A) transmitting transmitted signals from the communication channel over a first optical path to the communication device;

(B) transmitting transmitted signals from the communication device over a second optical path to the communication channel; and (C) generating the switching signal through a third optical path in response to transmitted signals received from either the communication device or communication channel.

* * * * *

UNITED STATES PATENT AND TRADEMARK OFFICE
CERTIFICATE OF CORRECTION

PATENT NO. : 5,946,394
DATED : August 31, 1999
INVENTOR(S) : Michael J. Gambuzza It is certified that error appears in the above-identified patent and that said Letters Patent is hereby corrected as shown below:

IN THE DRAWINGS:

Please delete drawing Figure 2 now in the above-identified patent, and substitute therefor the attached drawing Figure 2.

Column 5, line 30, delete "non-inverting" and insert therefor -- inverting --; and
Column 5, line 39, delete "non-inverting" and insert therefor -- inverting --.

IN THE CLAIMS:

Claim 2, column 7, line 28, delete "An" and insert therefor -- A --.

Signed and Sealed this

Twenty-second Day of May, 2001

Attest:

NICHOLAS P. GODICI

*Attesting Officer*     *Acting Director of the United States Patent and Trademark Office*